United States Patent
Tonari et al.

(10) Patent No.: US 12,339,733 B2
(45) Date of Patent: Jun. 24, 2025

(54) INFORMATION PROVIDING SYSTEM, INFORMATION PROVIDING METHOD AND RECORDING MEDIUM

(71) Applicant: NEC Platforms, Ltd., Kawasaki (JP)

(72) Inventors: Ken Tonari, Kanagawa (JP); Ryo Suzuki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 28 days.

(21) Appl. No.: 18/180,485

(22) Filed: Mar. 8, 2023

(65) Prior Publication Data

US 2023/0297460 A1 Sep. 21, 2023

(30) Foreign Application Priority Data

Mar. 16, 2022 (JP) .................. 2022-041608

(51) Int. Cl.
*G06F 11/07* (2006.01)

(52) U.S. Cl.
CPC ........ *G06F 11/079* (2013.01); *G06F 11/0793* (2013.01)

(58) Field of Classification Search
CPC ............... G06F 11/079; G06F 11/0793
See application file for complete search history.

(56) References Cited

U.S. PATENT DOCUMENTS

| 11,372,904 B2* | 6/2022 | Kaushik ............. G06F 9/45558 |
| 2024/0103948 A1* | 3/2024 | Manohar ............ G06F 11/0793 |

FOREIGN PATENT DOCUMENTS

| JP | 2009-223362 A | 10/2009 |
| JP | 2015-164005 A | 9/2015 |
| JP | 2018-18411 A | 2/2018 |
| JP | 2018-136656 A | 8/2018 |
| JP | 2019-49940 A | 3/2019 |
| JP | 2021-47536 A | 3/2021 |
| WO | 2016/075915 A1 | 5/2016 |
| WO | 2017/154844 A1 | 9/2017 |

OTHER PUBLICATIONS

Communication dated May 16, 2023 issued by the Japanese Intellectual Property Office in counterpart Japanese Application No. 2022-041608.

* cited by examiner

*Primary Examiner* — Nadeem Iqbal

(57) ABSTRACT

An information providing system acquires log data generated by an information equipment system, extracts a feature of the log data, acquires, from history information related to the information equipment system, information based on the feature, and outputs the acquired information.

7 Claims, 7 Drawing Sheets

FIG. 6

| SIMILAR EVENT | cos SIMILARITY |
|---|---|
| 2020/12/24:DISK FAILURE | 0.92 |
| 2019/3/3:DISK FAILURE | 0.91 |
| 2018/6/28:DISK FAILURE | 0.89 |

FIG. 7

| SIMILAR EVENT | cos SIMILARITY |
|---|---|
| 2020/12/24:DISK FAILURE | 0.42 |
| 2019/3/3:DISK FAILURE | 0.41 |
| 2018/6/28:DISK FAILURE | 0.30 |

FIG. 8

| SIMILAR EVENT | cos SIMILARITY |
|---|---|
| 2020/12/24:DISK FAILURE | 0.70 |
| 2019/1/1:PATH FAILURE | 0.65 |
| 2018/7/7:VOLTAGE ABNORMALITY | 0.51 |

INFORMATION PROVIDING SYSTEM, INFORMATION PROVIDING METHOD AND RECORDING MEDIUM

This application is based upon and claims the benefit of priority from Japanese patent application No. 2022-041608, filed on Mar. 16, 2022, the disclosure of which is incorporated herein in its entirety by reference.

TECHNICAL FIELD

The present disclosure relates to an information providing system, an information providing method and a recording medium.

BACKGROUND ART

Techniques for supporting maintenance work of information equipment systems have been proposed.

For example, the failure handling support system described in Japanese Unexamined Patent Application, First Publication No. 2018-136656 acquires handling details by extracting candidates for handling details from similar past failure handlings based on a failure message from a failure mail server.

SUMMARY

When retrieving a past event to be used as a reference for a certain event, it is expected that a more appropriate event can be detected if the event can be retrieved including temporal information.

An example object of the present invention is to provide an information providing system, an information providing method, and a recording medium capable of solving the above problems.

According to a first example aspect of the present disclosure, an information providing system includes: a memory configured to store instructions; and a processor configured to execute the instructions to: acquire log data generated by an information equipment system; extract a feature of the log data; acquire, from history information related to the information equipment system, information based on the feature; and output the acquired information.

According to a second example aspect of the present disclosure, an information providing method includes: acquiring log data generated by an information equipment system; extracting a feature of the log data; acquiring, from history information related to the information equipment system, information based on the feature; and outputting the acquired information.

According to a third example aspect of the present disclosure, a program causes a computer to execute: acquiring log data generated by an information equipment system; extracting a feature of the log data; detecting information on the basis of the feature from history information related to the information equipment system; and outputting the acquired information. The program may be stored in a non-transitory computer-readable medium.

When retrieving a past event to be used as a reference for a certain event, it is possible to search for the event including temporal information.

BRIEF DESCRIPTION OF THE DRAWINGS

FIG. 6 is a diagram showing a first example of recommendation output using cosine similarity according to the example embodiment.

FIG. 7 is a diagram showing a second example of recommendation output using cosine similarity according to the example embodiment.

FIG. 8 is a diagram showing a third example of recommendation output using cosine similarity according to the example embodiment.

EXAMPLE EMBODIMENT

Example embodiments of the present disclosure will be described below, but the following example embodiments shall not limit the disclosure according to the claims. Also, all combinations of features described in the example embodiments may not be essential for the solution of the disclosure.

Figure 1:
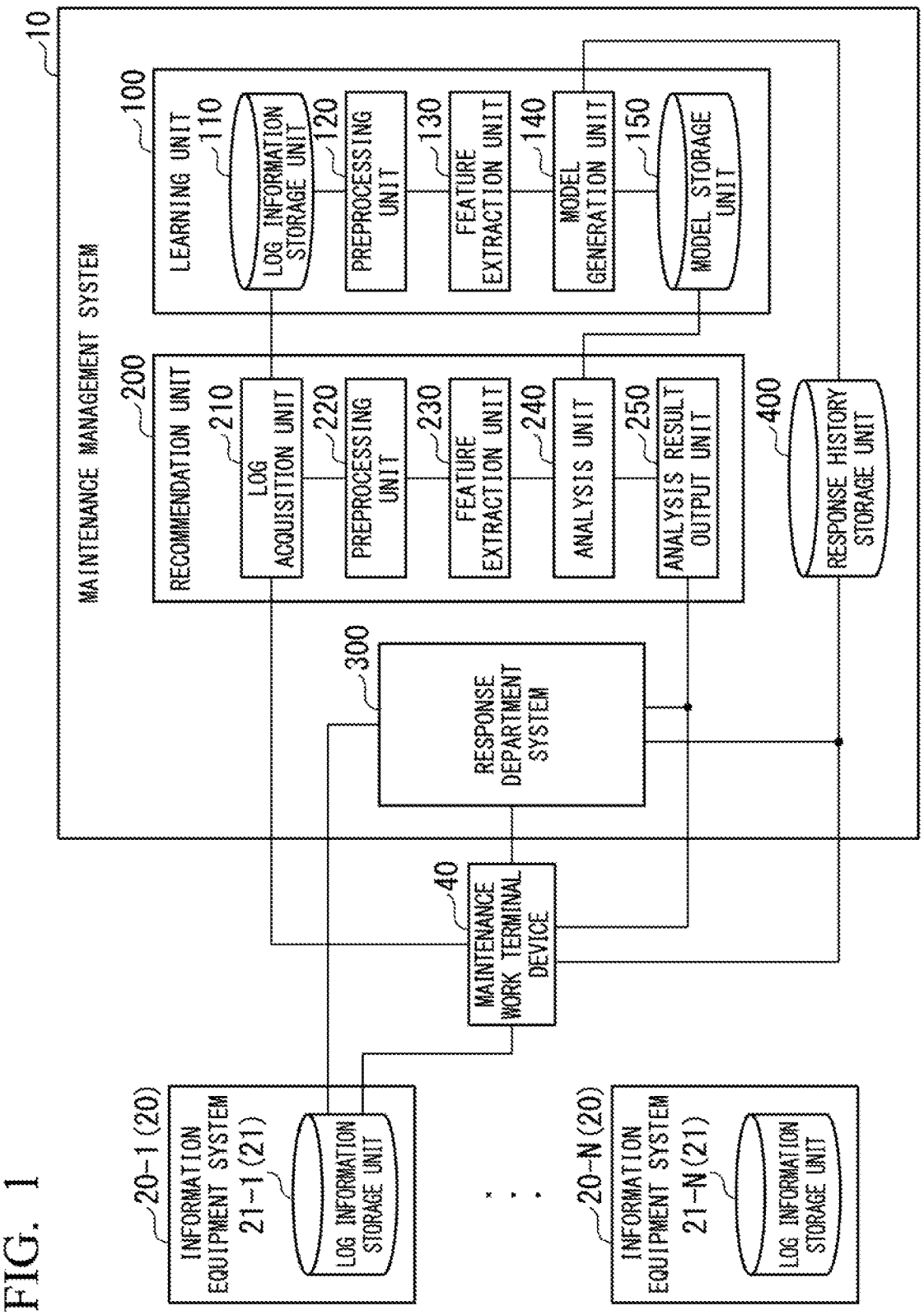
FIG. 1 is a diagram showing an example configuration of a maintenance management system according to an example embodiment.

FIG. 1 is a diagram illustrating an example configuration of the maintenance management system according to an example embodiment. With the configuration shown in FIG. 1, a maintenance management system 10 includes a learning unit 100, a recommendation unit 200, a response department system 300, and a response history storage unit 400. The learning unit 100 includes a log information storage unit 110, a preprocessing unit 120, a feature extraction unit 130, a model generation unit 140, and a model storage unit 150. The recommendation unit 200 includes a log acquisition unit 210, a preprocessing unit 220, a feature extraction unit 230, an analysis unit 240, and an analysis result output unit 250.

FIG. 1 also shows a maintenance work terminal device 40 and N (N is a positive integer) information equipment systems 20. Each information equipment system 20 includes a log information storage unit 21. The information equipment system 20 is a system to which information is provided by the maintenance management system 10 when a failure occurs, such as a system of a customer to whom maintenance service is provided.

When distinguishing the information equipment systems 20, they are described as information equipment system 20-1, . . . , information equipment system 20-N. When distinguishing the log information storage units 21 included in each respective information equipment system 20, they are denoted as log information storage unit 21-1, . . . , 21-N corresponding to the information equipment system 20-1, . . . , information equipment system 20-N.

The maintenance work terminal device 40 is a terminal device used by a maintenance worker. The maintenance work terminal device 40 is used, for example, to acquire information such as a log from the information equipment system and transfer it to the maintenance management system 10.

The maintenance management system 10 collects maintenance information such as failure reception and log information. The maintenance management system 10 also selects and provides information on similar events when a failure occurs. Selecting and providing information is also referred to as recommending.

The maintenance management system 10 corresponds to an example of an information providing system.

The learning unit 100 learns past events and records the learning results.

The log information storage unit 110 stores past failure logs. In particular, the log information storage unit 110 stores learning data in which past failure logs are associated with target labels indicating correct classification of the failure logs. The failure log referred to here is a log recorded (included) in a time period including the time of the failure occurrence.

The configuration of the maintenance management system 10 is not limited to a configuration using a physical server. The maintenance management system 10 may be configured using a virtual server on the cloud.

The preprocessing unit 120 performs preprocessing for feature extraction, such as resolving logs with time stamps into vocabulary items. A vocabulary item here is a part which constitutes a sentence, such as a word or a clause.

In addition, the preprocessing unit 120 determines whether or not there is a class with a small number of data items (the number of failure logs classified into that class) among the classes indicated by the target label in the learning data stored in the log information storage unit 110. Upon determining that there is a class with a small number of data items (for example, a predetermined number or less), the preprocessing unit 120 copies the data classified in that class (failure log with a target label) while changing the log collection time period, and adds it to the training data.

The preprocessing unit 120 corresponds to an example of a preprocessing means.

The feature extraction unit 130 performs feature extraction for logs, such as TF-IDF (Term Frequency-Inverse Document Frequency) vectorization of the vocabulary for each log.

In particular, the feature extraction unit 130 adds the inverse vector of the TF-IDF vector of the normal system log to the TF-IDF vector (feature vector) of the failure log. A normal system here is a normal state or operation. The normal system may be a state or operation during normal operation, or may be an extracted normal state or normal operation even when a failure occurs. The normal system log may be a normal log, or may be a log message extracted from a normal state or normal operation log when a failure occurs.

The feature extraction unit 130 corresponds to an example of a learning data feature extraction means.

The feature vector is not limited to the TF-IDF vector, and other methods such as BERT (Bidirectional Encoder Representations from Transformers) may be used as long as the text can be vectorized.

The model generation unit 140 learns failure classification by target labels of features (feature amounts) such as TF-IDF vectors. Classification of the feature can also be regarded as classification of the class of the log from which the feature is extracted, or classification of the class of the failure that occurred during the recording of the log. Target labels can be, for example, failure events (failure types) or suspected parts, or a combination thereof.

The model generation unit 140 corresponds to an example of a model generation means.

The model storage unit 150 stores a model obtained as a learning result of the feature classification.

The recommendation unit 200 acquires a failure log when a failure occurs in the information equipment system 20, and recommends past similar events.

The log acquisition unit 210 acquires a log when a failure occurs in the information equipment system 20. When a failure occurs in the information equipment system 20, a failure log is stored in the log information storage unit 21 in the information equipment system 20 in which the failure occurred. The log acquisition unit 210 acquires this failure log.

The log acquisition unit 210 corresponds to an example of a log acquisition means.

The method of transmitting logs from the information equipment system 20 to the log acquisition unit 210 is not limited to a specific method. For example, a maintenance worker may perform maintenance work on the information equipment system 20, collect the log using the maintenance work terminal device 40 or an external recording medium, and carry the maintenance work terminal device 40 or the external recording medium to the log acquisition unit 210. Alternatively, the information equipment system 20 may automatically transmit a log to the response department system 300 using a communication line. Alternatively, a log automatically or manually sent as an e-mail attachment or the like may be input to the log acquisition unit 210.

The preprocessing unit 220 performs the same preprocessing as the preprocessing unit 120 on the log acquired by the log acquisition unit 210.

The feature extraction unit 230 performs feature extraction similar to that performed by the feature extraction unit 130 on the log preprocessed by the preprocessing unit 220. The feature extraction unit 230 performs TF-IDF vectorization of the vocabulary for each log.

The feature extraction unit 230 corresponds to an example of a feature extraction means.

Based on the TF-IDF vector calculated by the feature extraction unit 230, the analysis unit 240 detects events similar to the failure occurrence event from the history information regarding the information equipment system 20. Specifically, the analysis unit 240 detects a similar event based on the cosine similarity between the TF-IDF vector calculated from the past log data of the information equipment system 20 and the TF-IDF vector calculated by the feature extraction unit 230, and obtains information on the detected similar event.

The analysis unit 240 also loads the model from the model storage unit 150, inputs the TF-IDF vector into the model, and estimates the failure event or the suspected part, or a combination thereof.

The analysis unit 240 corresponds to an example of a detection means.

The analysis result output unit 250 outputs (provides) information on similar events.

The analysis result output unit 250 corresponds to an example of an output means.

The response department system 300 refers to an operator of a call center or the like, or an automatic conversation program such as a chatbot in a Web system for failure handling.

The response history storage unit 400 stores the failure occurrence time, occurrence event, failure-occurring device, failure component, and treatment details for failures to which maintenance workers responded to.

If only events with low similarity are recommended in the recommendation result, or if the events selected with the highest similarity are different from the failure occurrence event, the maintenance management system 10 may propose a manual log analysis and re-learning request. The maintenance management system 10 attaches a label of the correct occurrence event classification and failure part classification to the log for which re-learning is requested based on the failure handling result, adds them to the learning data, re-learns, and updates the database and classification model.

Figure 2:
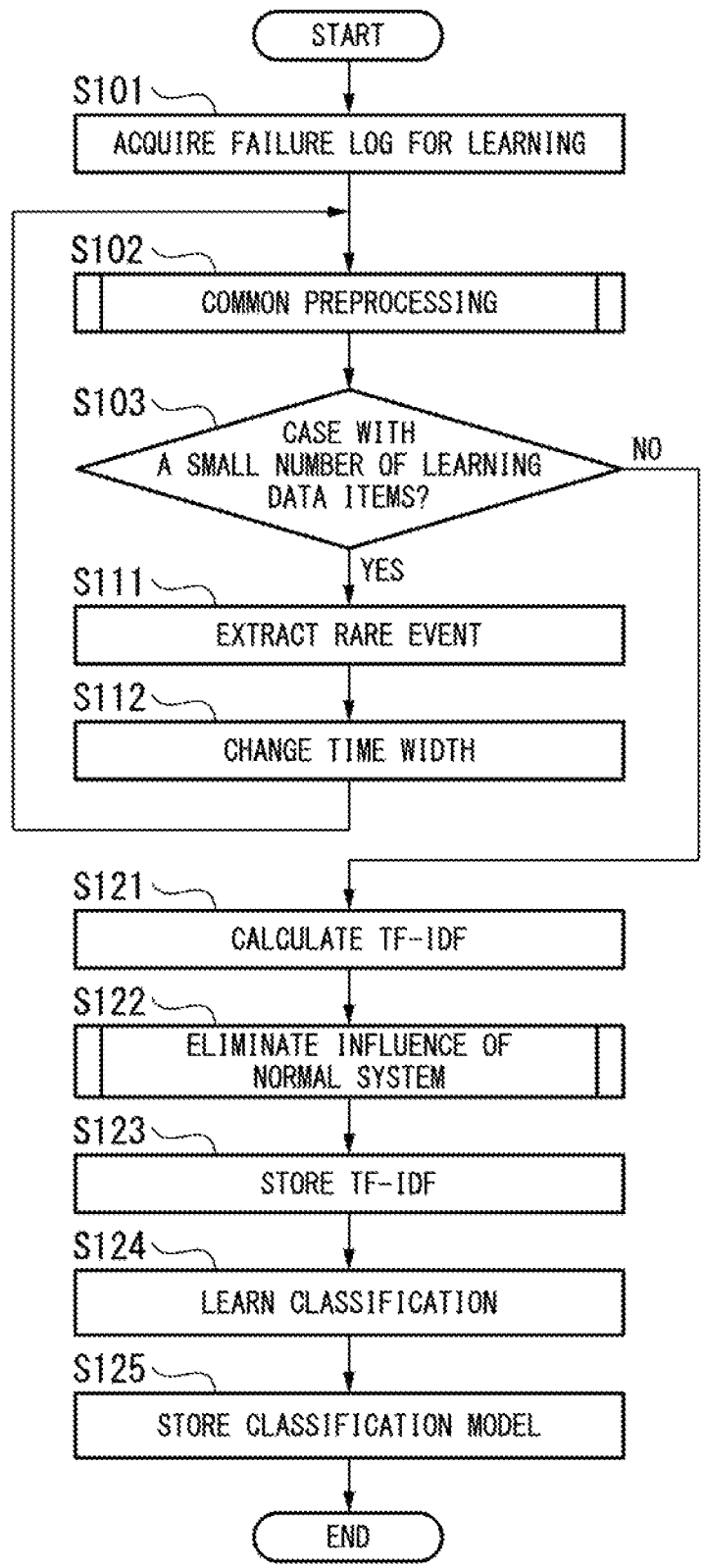
FIG. 2 is a diagram illustrating an example of a processing procedure in which a learning unit according to the example embodiment learns a log classification.

FIG. 2 is a diagram illustrating an example of a processing procedure for the learning unit 100 to learn log classification. Before the process of FIG. 2, the log information storage unit 110 accumulates log information of failures that have occurred in the past. The learning unit 100 performs learning through the process of FIG. 2 using the accumulated failure logs. In the process of FIG. 2, the learning unit 100 extracts a failure log that occurred in the past for learning from the log information storage unit 110, and transfers it to the preprocessing unit 120 (Step S101).

The preprocessing unit 120 performs common preprocessing when learning is performed and when a failure occurs (Step S102). This preprocessing is also called common preprocessing.

After the common preprocessing, the preprocessing unit 120 determines whether or not there is a rare event (Step S202). Specifically, the preprocessing unit 120 checks the target label for the learning data. The target label can be a failure event or suspected part, or a combination thereof. The target label shall be linked as a correct answer (training data) to the failure log as learning data.

An event for which the number of learning data items for the target label is equal to or less than a certain number is set a rare event, and the preprocessing unit 120 determines whether there is a rare event.

If it is determined that a rare event exists (Step S202: YES), the preprocessing unit 120 acquires learning data of the rare event (Step S111).

Then, the preprocessing unit 120 changes the predetermined time for determining how long before the occurrence of the failure the log data is to be cut out, for the acquired rare event learning data (Step S112).

After Step S112, the processing returns to Step S102.

In this case, in Step S102, the learning unit 100 cuts out the log data of the specified time determined in Step S112 for the newly acquired data. The learning unit 100 treats the cut-out data as preprocessed data different from the original data that was determined to be a rare event. The learning unit 100 repeats the loop of steps S103, S111, S112, and S102 until there are no more rare events.

On the other hand, if the preprocessing unit 120 determines in Step S202 that there is no rare event (Step S202: NO), the feature extraction unit 130 calculates a TF-IDF vector for each piece of learning data (Step S121).

Then, the feature extraction unit 130 performs processing to eliminate or reduce the influence of the normal system (Step S122).

The feature extraction unit 130 causes the model storage unit 150 to store the TF-IDF vector from which the influence of the normal system is eliminated or reduced (Step S123).

Next, the model generation unit 140 uses the TF-IDF vector as a feature (feature amount) and performs classification learning using a failure event, a suspected part, or a combination thereof as a target label (Step S124). The classification model here is not limited to a specific one. For example, the model generation unit 140 may use a support vector machine (SVM) or deep learning, but the present disclosure is not limited thereto.

The model generation unit 140 stores the classification model acquired by learning in the model storage unit 150 (Step S125).

After Step S125, the learning unit 100 ends the processing of FIG. 2.

Figure 3:
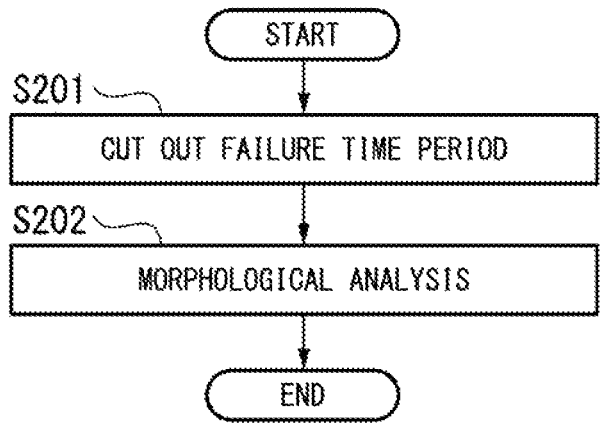
FIG. 3 is a diagram illustrating an example of a processing procedure in which a preprocessing unit according to the example embodiment performs common preprocessing.

FIG. 3 is a diagram illustrating an example of a processing procedure in which the preprocessing unit 120 performs common preprocessing. The preprocessing unit 120 performs the processing of FIG. 3 in Step S102 of FIG. 2.

In the process of FIG. 3, the preprocessing unit 120 extracts, from the log data, a log from a predetermined time before the failure occurrence time to the failure occurrence time (Step S201).

Then, the preprocessing unit 120 divides the log into vocabulary items (Step S202). The method by which the preprocessing unit 120 divides the log into vocabulary items is not limited to a specific method. Here, a case where the preprocessing unit 120 performs morphological analysis will be described as an example. Other possible methods include dividing log messages other than timestamps into tokens and applying a clustering algorithm to classify them.

After Step S202, the preprocessing unit 120 ends the processing of FIG. 3.

Figure 4:
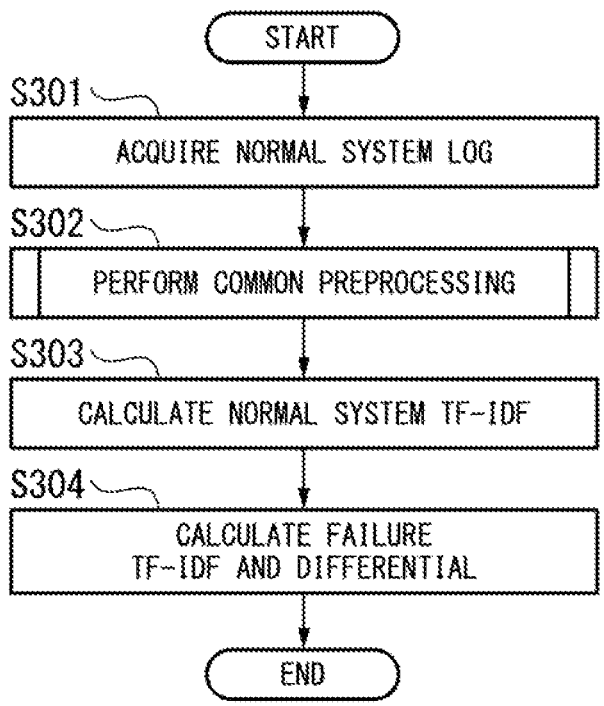
FIG. 4 is a diagram showing an example of a processing procedure in which a feature extraction unit according to the example embodiment eliminates or reduces the influence of a normal system from a failure log.

FIG. 4 is a diagram showing an example of a procedure of processing by the feature extraction unit 130 to eliminate or reduce the influence of the normal system from the failure log. The feature extraction unit 130 performs the processing of FIG. 4 in Step S122 of FIG. 2.

In the processing of FIG. 4, the feature extraction unit 130 acquires a normal system log from the log information storage unit 110 (Step S301).

Then, the feature extraction unit 130 performs common preprocessing on the acquired normal system log (Step S302). Step S302 is the same as Step S102, and the feature extraction unit 130 performs the process of FIG. 3 in Step S302. In this case, the preprocessing unit 120 is read as the feature extraction unit 130 in the description of the processing in FIG. 3 above.

Next, the feature extraction unit 130 calculates a TF-IDF vector for the normal system log for which preprocessing has been completed (Step S303).

Then, the feature extraction unit 130 adds the inverse vector of the TF-IDF vector of the normal system log to the TF-IDF vector of the failure log from which influence of the normal system is to be eliminated or reduced (Step S304).

After Step S304, the feature extraction unit 130 ends the processing of FIG. 4.

Figure 5:
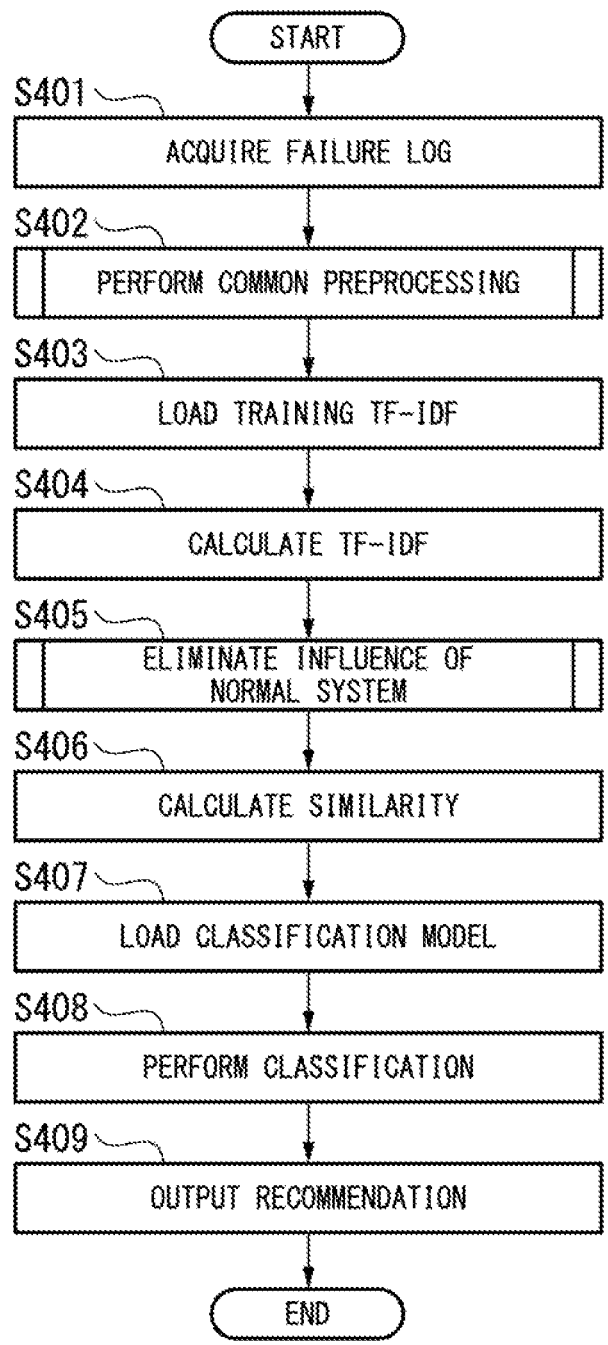
FIG. 5 is a diagram showing an example of a procedure of processing for recommending a similar event by the maintenance management system when a failure occurs in the information equipment system according to the example embodiment.

FIG. 5 is a diagram showing an example of the processing procedure in which the maintenance management system 10 recommends a similar event when a failure occurs in the information equipment system 20.

In the process of FIG. 5, the log acquisition unit 210 acquires the failure log of the information equipment system 20 (Step S401). A failure log is stored in the log information storage unit 21 when a failure occurs in the information equipment system 20. The log acquisition unit 210 acquires this failure log. As described above, the method of transmitting the log from the information equipment system 20 to the log acquisition unit 210 is not limited to a specific method.

Next, the preprocessing unit 220 performs common preprocessing (Step S402). Step S402 is the same as Step S102, with the preprocessing unit 220 performing the processing of FIG. 3 in Step S402. In this case, the preprocessing unit 120 is read as the preprocessing unit 220 in the description of the processing in FIG. 3.

The recommendation unit 200 also loads the TF-IDF vector from the model storage unit 150 (Step S403).

Next, the feature extraction unit 230 performs TF-IDF vector calculation of the failure log (Step S404).

Then, the feature extraction unit 230 performs processing to eliminate or reduce the influence of the normal system (Step S405). Step S405 is the same as Step S122, with the feature extraction unit 230 performing the processing of FIG. 4 in Step S405. In this case, the feature extraction unit 130 is read as the feature extraction unit 230 in the description of the processing in FIG. 4.

Next, the analysis unit 240 calculates the degree of similarity between the TF-IDF vector of the failure log from which the influence of the normal system has been eliminated or reduced and the learning TF-IDF that has loaded in Step S403 (Step S406). The degree of similarity here is not limited to a specific one. For example, the analysis unit 240 may calculate the Euclidean norm or cosine similarity as the degree of similarity, but the present disclosure is not limited thereto.

Next, the analysis unit 240 loads the classification model from the model storage unit 150 (Step S407).

Then, the analysis unit 240 inputs the TF-IDF vector of the failure log into the classification model to perform classification (Step S408).

The analysis result output unit 250 summarizes the past events with the highest degree of similarity obtained in Step S406, the classification result obtained in Step S408, and a message indicating the need for direct log confirmation as a recommendation, and outputs the generated recommendation (Step S409).

After Step S409, the recommendation unit 200 terminates the processing of FIG. 5.

FIG. 6 is a diagram showing a first example of recommendation output using cosine similarity. FIG. 6 shows an example of a case in which the maintenance management system 10 is able to recommend the same event as the failure event with a high degree of similarity. Specifically, all the events recommended by the maintenance management system 10 are "disk failure", which is the same as the failure occurrence event. The cosine similarity between the event recommended by the maintenance management system 10 and the failure event is relatively high, ranging from 0.89 to 0.92.

The maintenance management system 10 may associate the output of the recommendation illustrated in FIG. 6 with the related documents for each event, such as by linking the maintenance work logbook for each event, and present them to the maintenance worker. The maintenance worker can refer to the related documents and use them as a reference for responding to failure events.

FIG. 7 is a diagram showing a second example of recommendation output using cosine similarity. FIG. 7 shows an example in which the maintenance management system 10 is able to recommend events that are the same as the failure occurrence event, but the similarity is low. As in the case of FIG. 6, the maintenance management system 10 in FIG. 7 also recommends the same "disk failure" as the failure occurrence event. On the other hand, the cosine similarity of events recommended by the maintenance management system 10 is relatively low, ranging from 0.30 to 0.42.

In such a case, the maintenance management system 10 may propose a manual log analysis and a re-learning request. Upon receiving the re-learning request, the maintenance management system 10 confirms the failure event or suspected component, or combination thereof, that is the target label, assigns a new label, adds the new label to the learning data, and performs re-learning. The maintenance management system 10 performs the re-learning, for example, according to the processing procedure shown in FIG. 2.

FIG. 8 is a diagram showing a third example of recommendation output using cosine similarity. FIG. 8 shows an example in which the maintenance management system recommends an event different from the failure occurrence event. In the example of FIG. 8, the events recommended by the maintenance management system 10 are "disk failure", "path failure", and "voltage abnormality".

In this way, when recommended events are disparate, the maintenance management system 10 can determine that it is recommending an event different from the failure occurrence event.

As in the example of FIG. 8, even when the maintenance management system 10 recommends an event different from the failure occurrence event, the maintenance management system 10 may propose manual log analysis and a relearning request, as in the example in FIG. 7.

The maintenance management system 10 may further time-divide the logs from a predetermined time before the failure occurrence time to the failure occurrence time, and recommend the orderliness of the logs by time or similarity of sequence. For example, the maintenance management system 10 extracts logs from 30 minutes before the failure to the time when the failure occurs, and further divides the logs into 30 logs at intervals of 1 minute. As a result, it is expected that the maintenance management system 10 can also recommend operation errors (operation omissions, order errors) in the time-stamped operation log.

The maintenance management system 10 may detect a sign of failure in addition to or instead of providing information when a failure occurs. For example, if t is the time and $\Delta t$ is the time width, the time interval is set in the manner of time interval 1 being from t to t+$\Delta t$, time interval 2 being from t+$\Delta t$ to t+2$\Delta t$, time interval 3 being from t+2$\Delta t$ to t+3 $\Delta t$, . . . .

The maintenance management system 10 divides the failure logs for learning into each time interval, and performs learning on each log and each interval by the method described above. For example, the feature extraction unit 130 extracts the feature in each time interval into which the failure log for learning is divided. The feature extraction unit 130 extracts the feature for each failure (each failure type) and for each time interval. Then, the model generation unit 140 generates by learning a model that, for each failure and each time interval, calculates the likelihood (feature similarity) that a feature input to the model will be classified into the class of the failure and the time interval, and stores the model in the model storage unit 150. Each time interval here can be associated with a predicted time until failure occurs.

Then, the maintenance management system 10 calculates the degree of similarity for the new log by the same method as described above, and determines which interval of which failure has a high degree of similarity. For example, the feature extraction unit 230 calculates the feature of the log acquired by the log acquisition unit 210 for the latest minutes of the same time range as in the case of the feature extraction unit 130 (the time span from the latest time in the log). The analysis unit 240 inputs the feature calculated by the feature extraction unit 230 into the model, and calculates the likelihood of the class (failure and time interval) with the highest likelihood of classification (similarity of feature). If the calculated likelihood is greater than or equal to a predetermined threshold, the analysis unit 240 determines that a sign that a failure of that class (the class with the highest likelihood) will occur after the time indicated by the time interval for that class has been detected.

As a result, the maintenance management system 10 can presents, as recommendation how many minutes or how many days before the failure of a specific component the new log is similar to, and the recommendation of the maintenance management system 10 can also be used as a failure sign recommendation.

Alternatively, the learning unit 100 may detect a sign of failure based on logs for a plurality of time intervals. For example, the model generation unit 140 may generate a model that receives input of features for a plurality of time intervals.

Depending on the information equipment system 20, it is conceivable that logs cannot be taken out of the system due to security reasons. In such a case, the classification model learned by the maintenance management system 10 and the recommendation unit 200 may be installed at the customer's site. As a result, even in an environment in which logs cannot be taken out, recommendations similar to those in the case of transmitting logs to the maintenance management system 10 can be realized.

The maintenance management system 10 can be used, for example, to support identification and/or analysis of suspected incidents/failures and signs of failures in maintenance operations of information processing systems, information processing equipment, software, or their components.

In addition, the maintenance management system 10 is not limited to recommendations for failures in information equipment systems, and can also target various items for which logs with time stamps can be acquired. For example, the maintenance management system 10 may read symptoms that have appeared within a certain time period from an electronic medical record or the like, and output information indicating serious symptoms inferred from the symptoms and the expected time of onset.

Furthermore, for example, the maintenance management system 10 may read symptoms such as stiff shoulders, speechlessness, and dizziness from an electronic medical record, and present a message to the doctor, such as, "The symptoms are similar to those three days before the onset of cerebral infarction."

As described above, the log acquisition unit 210 acquires log data generated by the information equipment system 20. The feature extraction unit 230 extracts a feature of the log data. The analysis unit 240 detects information based on the feature from the history information regarding the information equipment system 20. The analysis result output unit 250 outputs the acquired information.

According to the maintenance management system 10, an event can be retrieved using information for the time period in which the log is recorded, by searching for the event using the log data of the information equipment system 20.

According to the maintenance management system 10, in this way, when searching for past events to be referenced for a certain event, it is possible to search for the event including temporal information.

In addition, according to the maintenance management system 10, by using log data, it is possible to eliminate subjectivity and variations in notation, thereby improving recommendation accuracy.

In addition, the maintenance management system 10 uses log data of the time span from the time of occurrence of a failure to a predetermined time before. As a result, when multiple failures have occurred in one device in the past, learning data corresponding to the number of failures can be collected with a single log collection, thereby improving the efficiency of learning data collection.

According to the maintenance management system 10, in maintenance management/incident management in an information processing system, information processing device, software, or their constituent elements, it is possible to support analysis of suspected failures from response history.

Information can be provided by any information processing system, information processing device, or software as long as there is an environment in which the functions of the maintenance management system 10 can be executed. For example, even in an environment where logs cannot be taken out due to security concerns, the functions of the maintenance management system 10 can be executed in that environment to provide information.

Moreover, according to the maintenance management system 10, not only failure analysis but also what is determined to be abnormal before an incident occurs can be treated as a sign of an incident, whereby countermeasures can be prompted before a failure occurs.

Further, in the maintenance management system 10, the log information stored in the log information storage unit 110 can be deleted after the feature extraction unit 130 extracts the feature of the log. According to the maintenance management system 10, it is also possible to reduce the amount of information to be held in this regard.

Also, the feature extraction unit 230 calculates a TF-IDF vector as a feature of the log data. The analysis unit 240 detects information from the history information on the basis of the degree of similarity between the TF-IDF vector as the feature of the log data and the TF-IDF vector indicated as the feature of the information included in the history information.

As a result, the maintenance management system 10 can calculate the degree of similarity based on the number or frequency of vocabulary items such as words in the log, and can exclude the influence of differences in the positions of vocabulary items in the log on the degree of similarity. In this regard, the maintenance management system 10 is expected to be able to determine the degree of similarity of failure events with high accuracy.

In addition, the feature extraction unit 230 extracts the feature of log data from a predetermined time before the failure of the information equipment system 20 to the time of the failure.

According to maintenance management system 10, by using log data for the time range from the time of failure to a predetermined time before the failure, rather than using all of the logs, it is expected that predictive signs before the failure occur will easily appear in the features. According to the maintenance management system 10, the recommendation accuracy can be improved in this respect.

Further, the analysis unit 240 estimates a suspected failure component of the information equipment system 20 on the basis of the feature.

As a result, the maintenance management system 10 can search for reference events using not only the similarity of the TF-IDF vectors but also the information on suspected failure component, and in this respect, more accurate recommendations can be made.

Further, the analysis unit 240 estimates the suspected failure component of the information equipment system 20 on the basis of the feature.

As a result, the maintenance management system 10 can search for a reference event using not only the similarity of the TF-IDF vectors but also the information on the failure event, and in this respect, more accurate recommendations can be made.

Upon determining that there is, among learning data in which past failure logs and correct classes in classification are linked, a class whose number of data items is less than a predetermined condition among the classes in the classification, the preprocessing unit 120 copies data classified in that class while changing the log collection time period and adds it to the training data. The model generation unit 140 learns the classification of the feature extracted from each log of the learning data.

According to the maintenance management system 10, when learning classification, it is expected that learning can be performed with greater accuracy, given that multiple data items of rare events are prepared with different log time ranges, and given that data fluctuations occur compared to simply copying data.

Further, the feature extraction unit 139 adds the inverse vector of the feature vector of the normal system log to the feature vector of the failure log included in the learning data for classification. The model generation unit 140 performs the classification learning using the feature vector of the failure log to which the inverse vector of the feature vector of the normal system log is added.

According to the maintenance management system 10, by adding the inverse vector of the feature vector of the normal system log to the feature vector of the failure log, it is possible to eliminate or reduce the influence of the normal system log description, and in this respect, the recommendation accuracy can be improved.

Further, the analysis result output unit 250 outputs information indicating the degree of similarity between the feature of a failure occurrence event of the information equipment system 20 and the feature of a reference event for the failure occurrence event.

Thereby, a person who refers to the information, such as a maintenance worker, can confirm the degree of similarity between the event for which the information is presented and the failure occurrence event targeted for maintenance.

As described above, according to the maintenance management system 10, it is possible to identify/recommend suspected parts/failure causes/responses based on the past response history with high accuracy, and to identify/recommend signs of failures with high accuracy.

Figure 9:
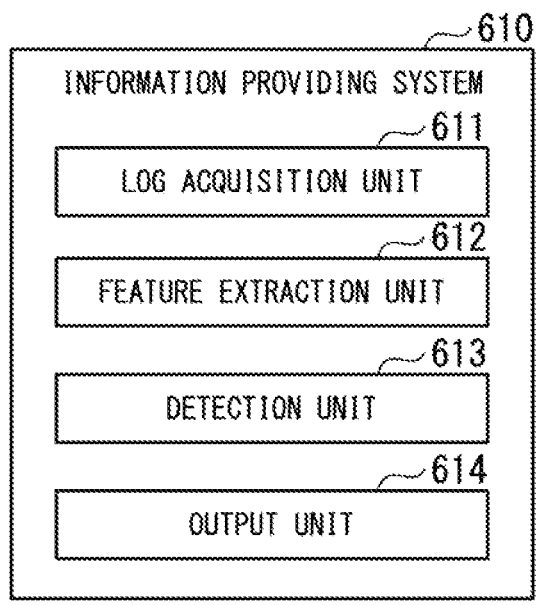
FIG. 9 is a diagram showing an example of the configuration of an information providing system according to an example embodiment.

FIG. 9 is a diagram showing an example of the configuration of the information providing system according to an example embodiment. With the configuration shown in FIG. 9, an information providing system 610 includes a log acquisition unit 611, a feature extraction unit 612, a detection unit 613, and an output unit 614.

With such a configuration, the log acquisition unit 611 acquires log data generated by the information equipment system. The feature extraction unit 612 extracts a feature (feature amount) of the log data. The detection unit 613 detects information based on the feature from the history information regarding the information equipment system. The output unit 614 outputs the acquired information.

The log acquisition unit 611 corresponds to an example of a log acquisition means. The feature extraction unit 612 corresponds to an example of a feature extraction means. The detection unit 613 corresponds to an example of a detection means. The output unit 614 corresponds to an example of an output means.

According to the information providing system 610, by searching for an event using the log data of the information equipment system, it is possible to search for the event using the information for the time during which the log is recorded. According to the information providing system 610, in this way, when searching for past events to be referred to regarding a certain event, it is possible to search for the event including temporal information.

In addition, according to the information providing system 610, by using log data, it is possible to eliminate subjectivity and variations in notation, thereby improving recommendation accuracy.

Also, the information providing system 610 uses log data of a time span from the time of occurrence of a failure to a predetermined time before. As a result, when multiple failures have occurred in one device in the past, learning data corresponding to the number of failures can be collected with a single log collection, thereby improving the efficiency of learning data collection.

Figure 10:
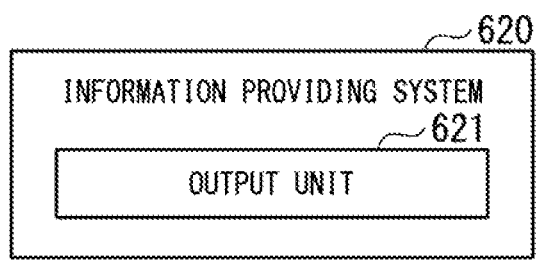
FIG. 10 is a diagram showing another example of the configuration of the information providing system according to an example embodiment.

FIG. 10 is a diagram showing another example of the configuration of the information providing system according to an example embodiment. With the configuration shown in FIG. 10, the information providing system 620 includes an output unit 621.

With such a configuration, the output unit 621 outputs information indicating the degree of similarity between a feature of a failure occurrence event of an information equipment system and a feature of a reference event for the failure occurrence event.

The output unit 621 corresponds to an example of an output means.

According to the information providing system 620, a person who refers to information, such as a maintenance worker, can confirm the degree of similarity between the event for which the information is presented and the failure occurrence event targeted for maintenance.

Figure 11:
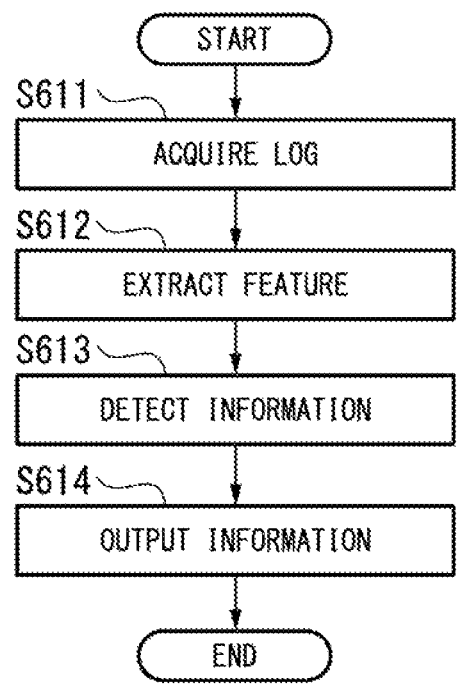
FIG. 11 is a diagram showing an example of a processing procedure in the information providing method according to an example embodiment.

FIG. 11 is a diagram showing an example of a processing procedure in the information providing method according to an example embodiment. The information providing method shown in FIG. 11 includes acquiring a log (Step S611), extracting a feature (Step S612), detecting information (Step S613), and outputting information (Step S614).

In acquiring a log (Step S611), log data generated by the information equipment system is acquired. In extracting a feature (Step S612), the feature of the acquired log data is extracted. In detecting information (Step S613), information is detected based on the feature from the history information regarding the information equipment system. In outputting information (Step S614), the acquired information is output.

According to the information providing method shown in FIG. 11, by searching for an event using the log data of the information equipment system, it is possible to search for the event using the information for the time during which the log is recorded. According to the information providing method shown in FIG. 11, in this way, when searching for past events to be referred to regarding a certain event, it is possible to search for the event including temporal information.

Further, according to the information providing method shown in FIG. 11, by using log data, it is possible to eliminate subjectivity and variations in notation, thereby improving recommendation accuracy.

Also, the information providing method shown in FIG. 11 uses log data of a time span from the time of occurrence of a failure to a predetermined time before. As a result, when multiple failures have occurred in one device in the past, learning data corresponding to the number of failures can be collected with a single log collection, thereby improving the efficiency of learning data collection.

Figure 12:
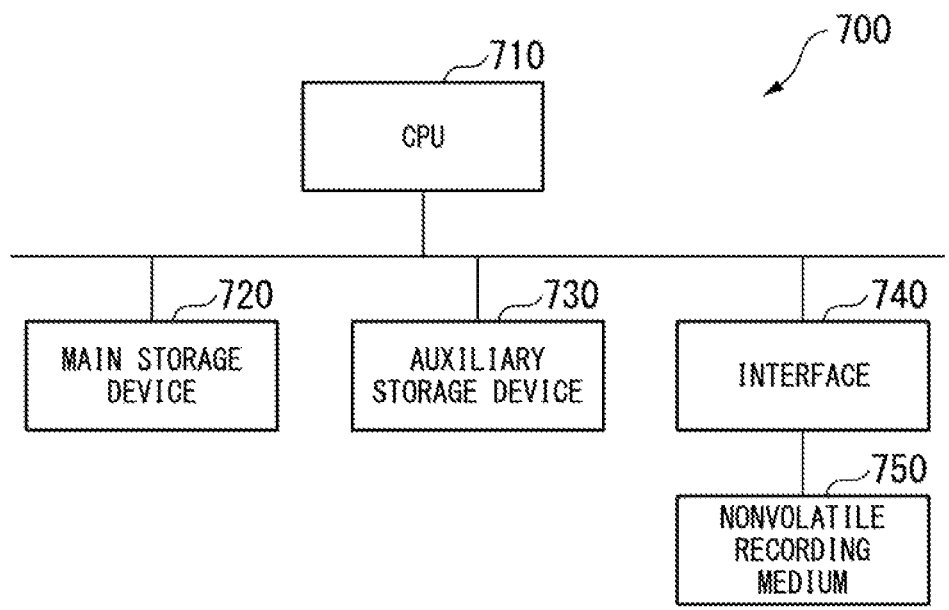
FIG. 12 is a schematic block diagram showing the configuration of a computer according to at least one example embodiment.

FIG. 12 is a schematic block diagram showing the configuration of a computer according to at least one example embodiment.

With the configuration shown in FIG. 12, a computer 700 includes a CPU 710, a main storage device 720, an auxiliary storage device 730, an interface 740, and a nonvolatile recording medium 750.

Any one or more of the functions of the maintenance management system 10, the information providing system 610, and the information providing system 620, or part thereof, may be implemented in the computer 700. In that case, the operation of each processing unit described above is stored in the auxiliary storage device 730 in the form of a program. The CPU 710 reads out the program from the auxiliary storage device 730, deploys the program in the main storage device 720, and executes the above processing according to the program. In addition, the CPU 710 secures storage areas corresponding to the storage units described above in the main storage device 720 according to the program. Communication between each device and another device is performed by the interface 740 having a communication function and performing communication under the control of the CPU 710. The interface 740 also has a port for the nonvolatile recording medium 750 and thereby reads information from the nonvolatile recording medium 750 and writes information to the nonvolatile recording medium 750.

When the maintenance management system 10 is implemented in the computer 700, the operations of each part of the maintenance management system 10 are stored in the auxiliary storage device 730 in the form of programs. The CPU 710 reads out the program from the auxiliary storage device 730, deploys the program in the main storage device 720, and executes the above processing according to the program.

In addition, the CPU 710 secures a storage area in the main storage device 720 for the maintenance management system 10 to perform processing according to the program. Communication between the maintenance management system 10 and other devices is performed by the interface 740 having a communication function and operating under the control of the CPU 710. Interaction between the maintenance management system 10 and the user is executed by the interface 740 having a display device and an input device, displaying various images under the control of the CPU 710, and accepting user operations.

When the information providing system 610 is implemented in the computer 700, the operations of each part of the information providing system 610 are stored in the auxiliary storage device 730 in the form of programs. The CPU 710 reads out the program from the auxiliary storage device 730, deploys the program in the main storage device 720, and executes the above processing according to the program.

In addition, the CPU 710 secures a storage area in the main storage device 720 for the information providing system 610 to perform processing according to the program. Communication between the information providing system 610 and other devices is performed by the interface 740 having a communication function and operating under the control of the CPU 710. Interaction between the information providing system 610 and the user is executed by the interface 740 having a display device and an input device, displaying various images under the control of the CPU 710, and accepting user operations.

When the information providing system 620 is implemented in the computer 700, the operations of each part of the information providing system 620 are stored in the auxiliary storage device 730 in the form of programs. The CPU 710 reads out the program from the auxiliary storage device 730, deploys the program in the main storage device 720, and executes the above processing according to the program.

In addition, the CPU 710 secures a storage area in the main storage device 720 for the information providing system 620 to perform processing according to the program. Communication between the information providing system 620 and other devices is performed by the interface 740 having a communication function and operating under the control of the CPU 710. Interaction between the information providing system 620 and the user is executed by the interface 740 having a display device and an input device, displaying various images under the control of the CPU 710, and accepting user operations.

Any one or more of the programs described above may be recorded in the nonvolatile recording medium 750. In this case, the interface 740 may read the program from the nonvolatile recording medium 750. Then, the CPU 710 may directly execute the program read by the interface 740, or execute the program after being temporarily stored in the main storage device 720 or the auxiliary storage device 730.

A program for executing all or part of the processing performed by the maintenance management system 10, the information providing system 610, and the information providing system 620 may be recorded on a computer-readable recording medium, and the program recorded on this recording medium may be read into a computer system and executed, whereby the processing of each unit may be performed. It should be noted that the "computer system" referred to here includes an operating system and hardware such as peripheral devices.

In addition, the "computer-readable recording medium" refers to portable media such as flexible discs, magneto-optical discs, ROMs (Read Only Memories), CD-ROMs (Compact Disc Read Only Memories), and storage devices such as hard disks built into computer systems. Further, the program may be for realizing some of the functions described above, or may be capable of realizing the functions described above in combination with a program already recorded in the computer system.

While preferred example embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

Some or all of the above-described example embodiments can also be described as in the following supplementary notes, but are not limited thereto.

(Supplementary Note 1)

An information providing system comprising:
a memory configured to store instructions; and
a processor configured to execute the instructions to:
acquire log data generated by an information equipment system;
extract a feature of the log data;
acquire, from history information related to the information equipment system, information based on the feature; and
output the acquired information.

(Supplementary Note 2)

The information providing system according to Supplementary Note 1, wherein the processor is configured to execute the instructions to:
calculate a first term frequency—inverse document frequency (TF-IDF) vector as the feature of the log data;
calculate a second TF-IDF vector as a feature of information included in the history information; and
acquire the information from the history information based on a degree of similarity between the first TF-IDF vector and the second TF-IDF vector.

(Supplementary Note 3)

The information providing system according to Supplementary Note 1 or Supplementary Note 2, wherein, the processor is configured to execute the instructions to extract a feature of log data from a predetermined time before occurrence of a failure in the information equipment system to the time of the failure.

(Supplementary Note 4)

The information providing system according to any one of Supplementary Notes 1 to 3, wherein the processor is configured to execute the instructions to estimate a suspected failure component of the information equipment system based on the feature.

(Supplementary Note 5)

The information providing system according to any one of Supplementary Notes 1 to 4, wherein the processor is configured to execute the instructions to estimate a failure occurrence event of the information equipment system based on the feature.

(Supplementary Note 6)

The information providing system according to any one of Supplementary Notes 1 to 5, wherein the processor is configured to execute the instructions to:
determine, among correct classes included in learning data in which past failure logs and the correct classes are linked, whether there is a correct class whose number included in the learning data is less than a predetermined number;
change collection time period of the past failure log linked with the correct class whose number included in the learning data is less the predetermined number;
copy the past failure log whose collection time period is changed; and
add the copied failure log in the learning data; and
cause a model to learn classification of a feature extracted from each log in the learning data.

(Supplementary Note 7)

The information providing system according to any one of Supplementary Notes 1 to 5, wherein the processor is configured to execute the instructions to:
add an inverse vector of a feature vector of a normal system log to a feature vector of a failure log included in learning data for classification; and
cause a model to learn the classification using the feature vector of the failure log to which the inverse vector of the feature vector of the normal system log is added.

(Supplementary Note 8)

The information providing system according to any one of Supplementary Notes 1 to 5, wherein the processor is configured to execute the instructions to:
generate a model for calculating likelihood of classifying a log for each type of failure and for each time interval acquired by dividing time until a failure occurs; and
detect a sign of failure occurrence by using the model.

(Supplementary Note 9)

An information providing system comprising:
a memory configured to store instructions; and
a processor configured to execute the instructions to:
output information indicating a degree of similarity between: a feature of a failure occurrence event of an information equipment system; and a feature of a reference event for the failure occurrence event.

(Supplementary Note 10)

An information providing method comprising:
acquiring log data generated by an information equipment system;
extracting a feature of the log data;
acquiring, from history information related to the information equipment system, information based on the feature; and
outputting the acquired information.

(Supplementary Note 11)

A non-transitory computer-readable medium that stores a program for causing a computer to execute:
acquiring log data generated by an information equipment system;
extracting a feature of the log data;
detecting information on the basis of the feature from history information related to the information equipment system; and
outputting the acquired information.

What is claimed is:

1. An information providing system comprising:
a memory storing instructions; and
a processor configured to execute the instructions to:
acquire log data generated by an information equipment system;
calculate a first term frequency-inverse document frequency (TF-IDF) vector to extract a feature of the log data;
calculate a second TF-IDF vector as a feature of information included in history information related to the information equipment system;
acquire information from the history information based on a degree of similarity between the first TF-IDF vector and the second TF-IDF vector;
output the acquired information;
generate a model for calculating likelihood of classifying a log for each type of failure and for each time interval acquired by dividing a time until a failure occurs; and detect a sign of failure occurrence of the information equipment system by using the model and the extracted feature of the log data.

2. The information providing system according to claim 1, wherein the processor is configured to execute the instructions to extract the feature of the log data from a predetermined time before occurrence of a failure in the information equipment system to a time of the failure.

3. The information providing system according to claim 1, wherein the processor is configured to execute the instructions to estimate a suspected failure component of the information equipment system based on the feature of the log data.

4. The information providing system according to claim 1, wherein the processor is configured to execute the instructions to estimate a failure occurrence event of the information equipment system based on the feature of the log data.

5. An information providing system comprising:
a memory configured to store instructions; and
a processor configured to execute the instructions to:
acquire log data generated by an information equipment system;
extract a feature of the log data;
acquire, from history information related to the information equipment system, information based on the feature;
output the acquired information;
determine, among correct classes included in learning data in which past failure logs and the correct classes are linked, whether there is a correct class having a number less than a predetermined number;
change a collection time period of the past failure log linked with the correct class having the number less the predetermined number;
copy the past failure log that the collection time period of which has been changed;
add the copied failure log in the learning data; and
cause a model to learn classification of the extracted feature of the log data by using the learning data.

6. The information providing system according to claim 1, wherein the processor is configured to execute the instructions to:
add an inverse vector of a feature vector of a normal system log to a feature vector of a failure log included in learning data for classification; and
cause a model to learn classification of the feature extracted from the log data using the feature vector of the failure log to which the inverse vector of the feature vector of the normal system log is added.

7. An information providing method performed by a computer and comprising:
acquiring log data generated by an information equipment system;
calculating a first term frequency-inverse document frequency (TF-IDF) vector to extract a feature of the log data;
calculating a second TF-IDF vector as a feature of information included in history information related to the information equipment system;
acquiring information from the history information based on a degree of similarity between the first TF-IDF vector and the second TF-IDF vector;
outputting the acquired information;
generating a model for calculating likelihood of classifying a log for each type of failure and for each time interval acquired by dividing a time until a failure occurs; and
detecting a sign of failure occurrence of the information equipment system by using the model and the extracted feature of the log data.

* * * * *